United States Patent

[11] 3,626,806

| [72] | Inventor | Alton L. Fritz |
| | | Phoenix, Ariz. |
| [21] | Appl. No. | 18,801 |
| [22] | Filed | Mar. 2, 1970 |
| [45] | Patented | Dec. 14, 1971 |
| [73] | Assignee | Royal Industries |
| | | Pasadena, Calif. |
| | | Original application Mar. 3, 1969, Ser. No. 803,864, now Patent No. 3,513,521. Divided and this application Mar. 2, 1970, Ser. No. 18,801 |

[54] PROTECTIVE AND DECORATIVE EDGING
2 Claims, 19 Drawing Figs.
[52] U.S. Cl. .................................................. 90/19,
144/134 A, 144/145 A
[51] Int. Cl. .................................................. B23c 1/06
[50] Field of Search .......................................... 90/18, 19,
20, DIG. 3; 144/134 A, 136 R, 145 A

[56] References Cited
UNITED STATES PATENTS
| 2,142,863 | 1/1939 | Whitney | 144/145 A |
| 2,722,957 | 11/1955 | Marvosh | 144/134 A |
| 2,230,292 | 2/1941 | Faso | 90/19 X |
| 3,255,790 | 6/1966 | Manasek et al. | 90/19 X |

Primary Examiner—Gil Weidenfeld
Attorney—Lynn G. Foster

ABSTRACT: Method and apparatus for preparing a workpiece and affixing protective and decorative edging, preferably T-edging, to the peripheral edge of the workpiece, the apparatus providing (a) a slotting head for guiding the workpiece in a predetermined orientation and a moving slotting blade for cutting a groove in the peripheral edge of the workpiece; (b) a cutting tool for guiding the displacement of the T-edging, for maintaining the leading end portion of a T-edging in a proper orientation and for selectively, at the election of the operator, notching out a length of the tongue of the T-edging at a well defined position and/or completely severing the T-edging at a precise location; and (c) a hammer for forcing the tongue of the T-edging into the slot formed in the workpiece, the hammer operating only when displaced from the at rest position by force applied to the workpiece. An indicator provides reference marks which, when aligned with a corner of the workpiece, indicates to an operator when to notch the tongue of the T-edging so that the notch will be properly located at the corner of the workpiece. Similarly, the location of the severed end of the T-edging can be predetermined to eliminate any gap between or overlap of the free ends of the T-edging disposed around the entire periphery of the workpiece.

Patented Dec. 14, 1971

INVENTOR.
ALTON L. FRITZ
BY
ATTORNEY

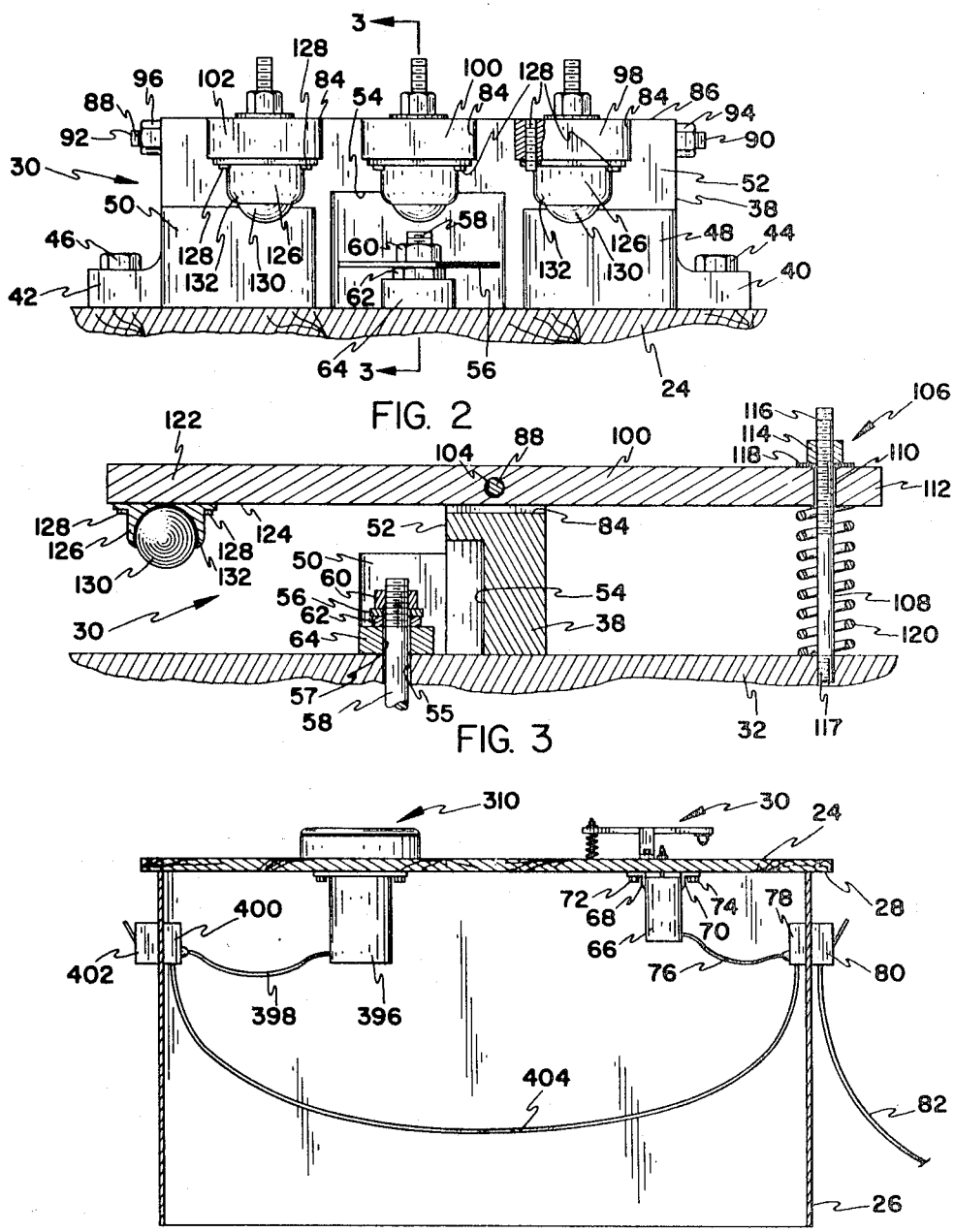

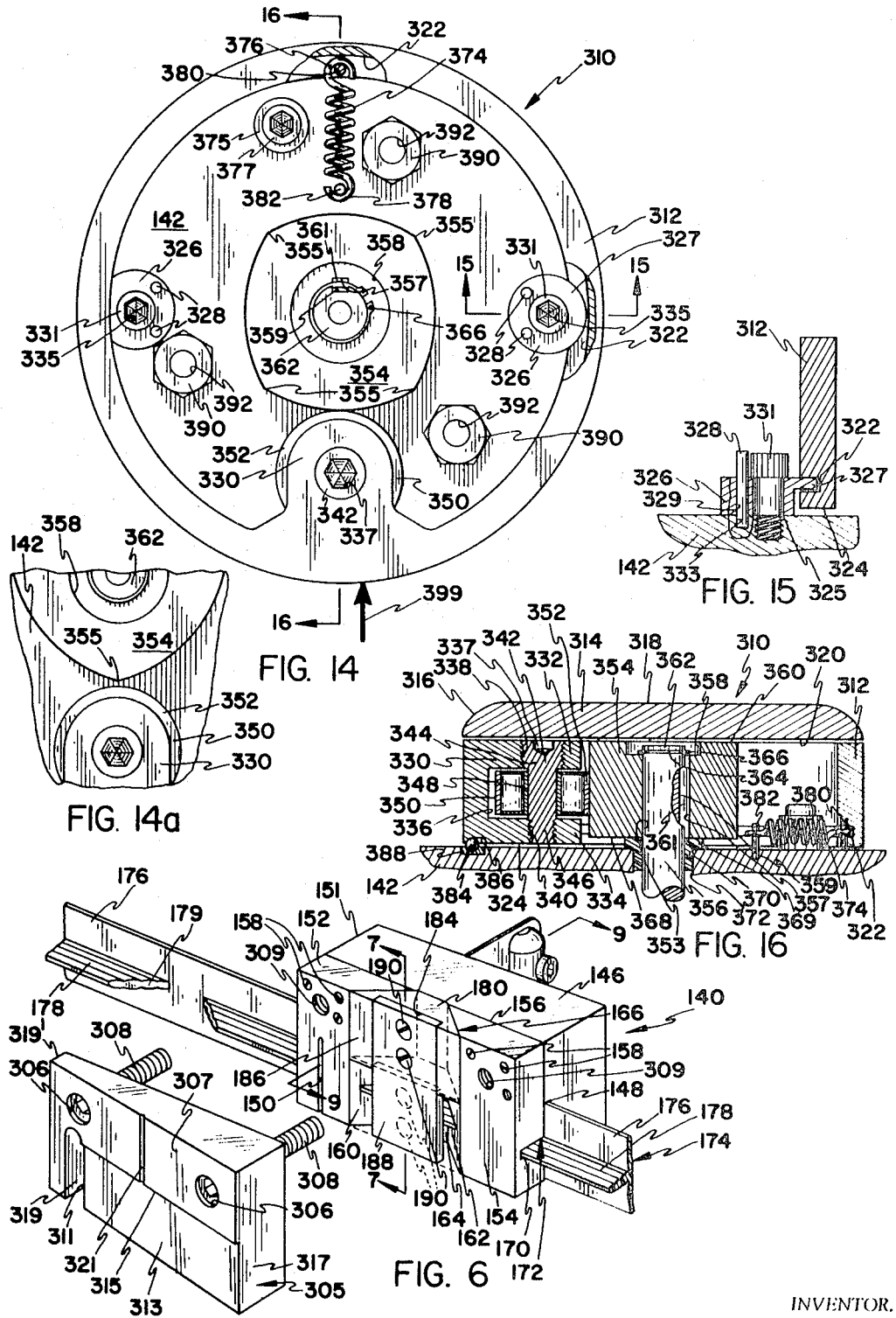

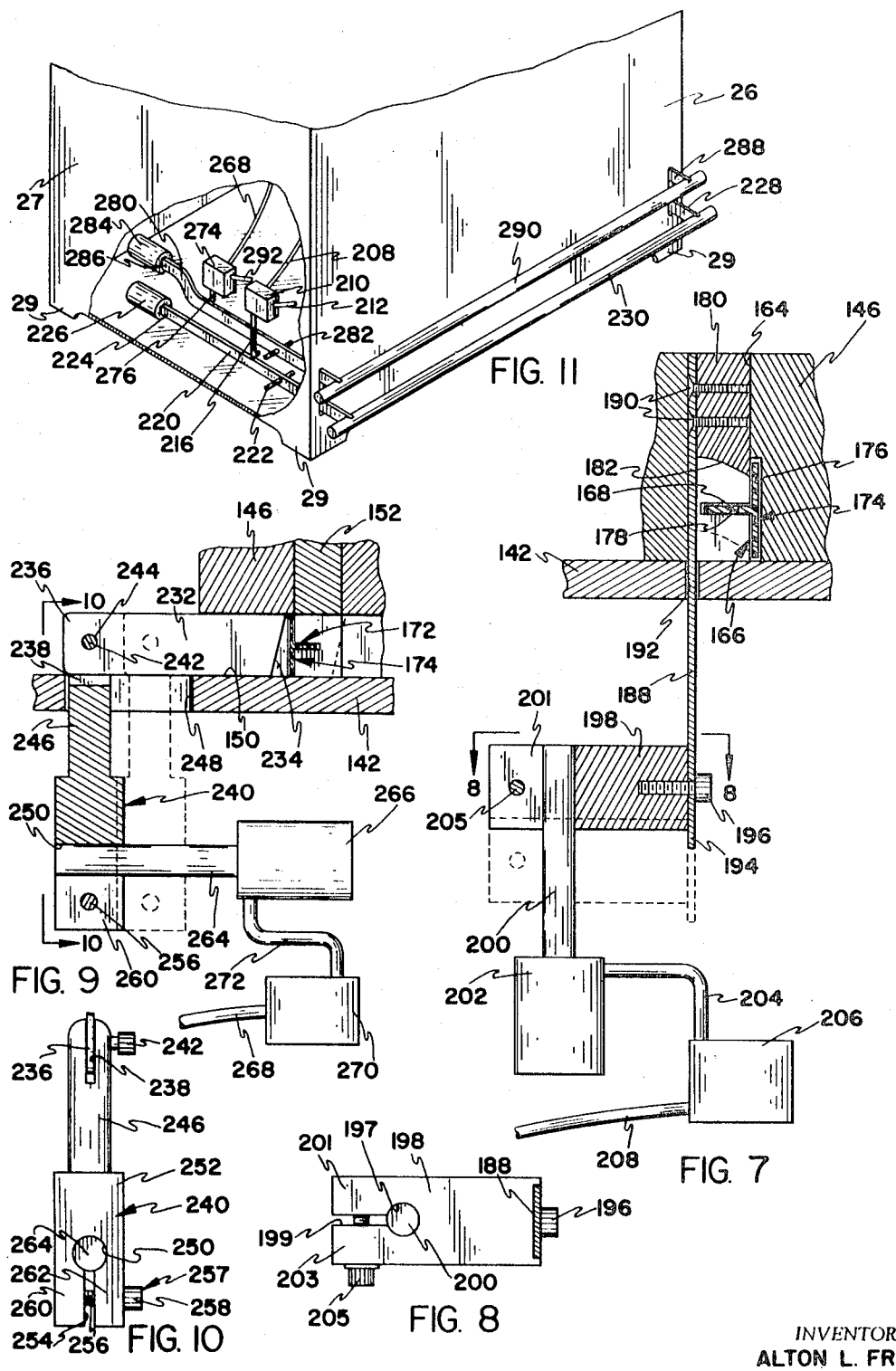

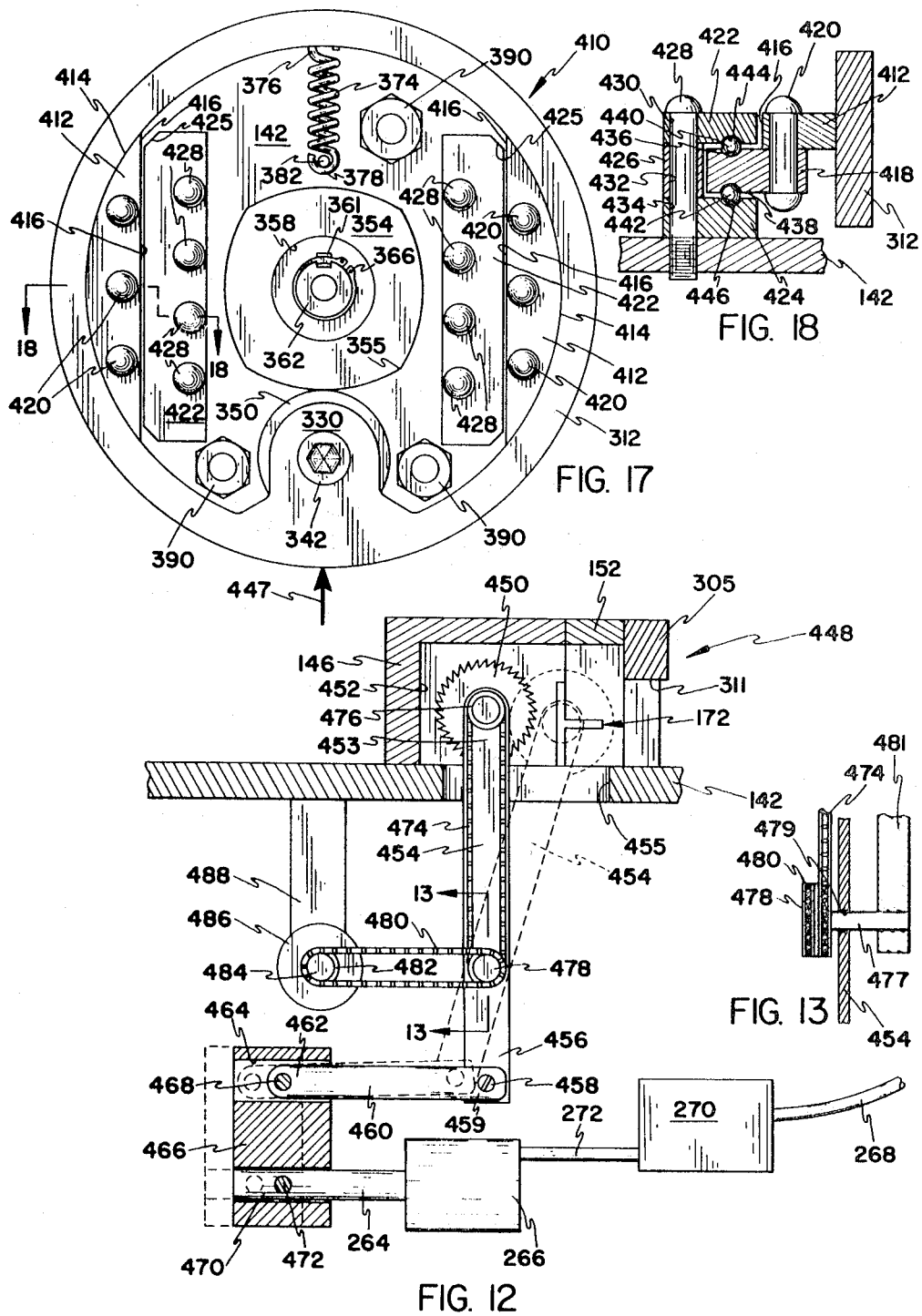

PROTECTIVE AND DECORATIVE EDGING

This application is a division of my parent application, Ser. No. 803,864, filed Mar. 3, 1969, and now U.S. Pat. No. 3,513,521.

FIELD OF THE INVENTION

The invention relates to securing protective and decorative edging to a workpiece and more particularly to method and apparatus for grooving the peripheral edge of a workpiece to receive edging, such as T-edging.

BACKGROUND

The protection of the edges of workpieces with plastic or resilient edging material is well known. Commonly, the workpiece is provided with a peripheral groove into which a portion of the edging material is inserted either by hand or mechanically. Conventional structures for edging material fabricating a groove or other receptacle in the workpiece have been used. Nevertheless, the grooving of a workpiece continues to be a time-consuming, tedious process.

BRIEF SUMMARY AND OBJECTS

A presently preferred embodiment of the invention comprises a working table, area or bench which is adapted to prepare a workpiece to receive resilient T-edging and to secure the T-edging to the workpiece. T-edging, as used in this specification, means any suitable T-shaped protective edging material, usually where the tongue or shank of the "T" forms an anchor portion and the top surface of the "T" forms an exposed protective and sometimes decorative portion. The workbench has, at the upper surface thereof, a slotting head for rapidly and accurately cutting a slot in the peripheral edge of the workpiece.

It is an important object of the present invention to provide improved structure and method for providing a precisely located and oriented peripheral slot in the workpiece.

This and other objects of the present invention will become more fully apparent from the following description and appended claims taken in conjunction with the accompanying drawings wherein:

BRIEF DESCRIPTION OF THE FIGURES

FIG. 2 is an enlarged front elevational view, taken along line 2—2 of FIG. 1, of the presently preferred slotting head part of the invention, portions being broken away to reveal inner connecting structure;

FIG. 3 is an enlarged transverse cross section taken along line 3—3 of FIG. 2;

FIG. 4 is a diagrammatic transverse cross section, taken along line 4—4 of FIG. 1, illustrating electrical circuitry used to operate the slotting head and hammer;

FIG. 6 is a partially exploded perspective view of the guiding and cutting unit of FIGS. 1 and 5, with the T-edging in place and a section of the tongue thereof being notched away;

FIG. 7 is a transverse cross section taken along line 7—7 of FIG. 6 with some parts shown diagrammatically;

FIG. 8 is a top plan view taken along line 8—8 of FIG. 7;

FIG. 9 is a transverse cross section taken along line 9—9 of FIG. 6 with some parts shown diagrammatically;

FIG. 10 is a side elevation taken along line 10—10 of FIG. 9;

FIG. 11 is a perspective of the lower portion of the embodiment of FIG. 1 with some parts broken away to reveal the cutting blade actuating structure and other parts shown diagrammatically;

FIG. 12 is a cross section illustrating another presently preferred severing embodiment, with some parts shown diagrammatically for cutting edging at desired locations;

FIG. 13 is a transverse cross section taken along line 13—13 of FIG. 12;

FIG. 14 is a top plan view of the hammer of FIGS. 1 and 5 in the activated position with the hammer cap removed;

FIG. 14A is a top fragmentary plan view of the hammer of FIG. 14 with the cap removed and in its at-rest position;

FIGS. 15 and 16 are transverse cross sections respectively taken along lines 15—15 and 16—16 of FIG. 14, respectively;

FIG. 17 is a top plan view of another presently preferred hammer embodiment in the activated position with the hammer cap removed; and FIG. 18 is a transverse cross section taken along line 18—18 of FIG. 17.

DETAILED DESCRIPTION

General

Figure 1:
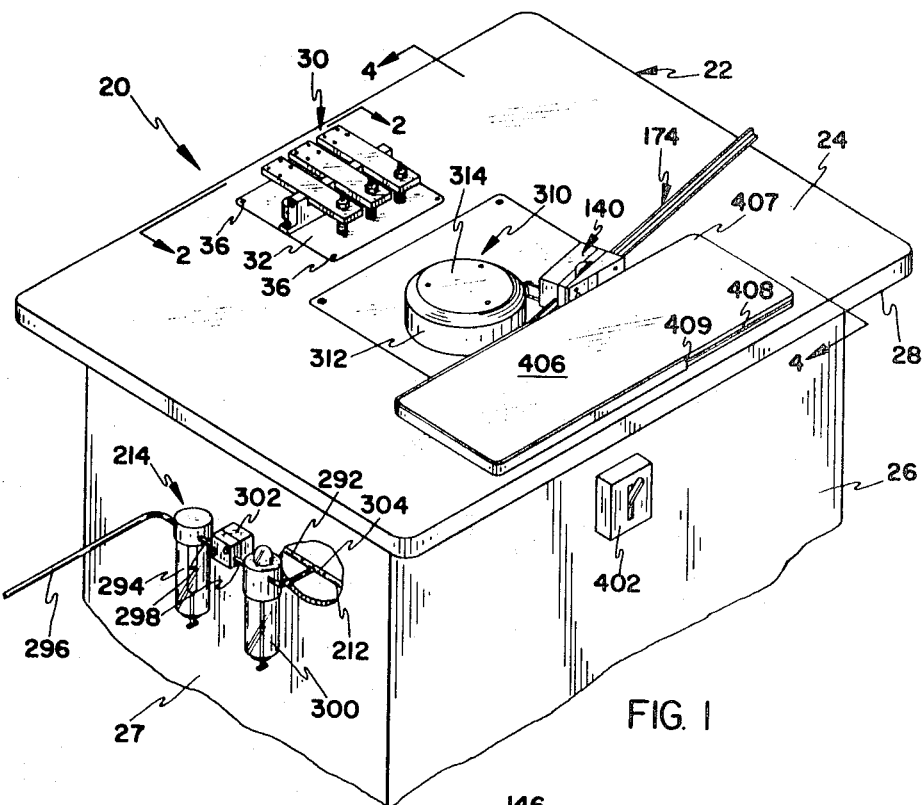
FIG. 1 is an elevated perspective of a presently preferred embodiment of this invention for securing protective edging to a workpiece.

With reference particularly to FIG. 1, the edging apparatus, generally designated 20, comprises a workbench 22 having a substantially flat upper surface 24, fabricated of wood, metal or the like which is carried upon a hollow, essentially rectangular base 26. The base 26 may be supported upon ground or floor-engaging pedestals 29 (FIG. 11). The upper surface 24 has greater longitudinal and transverse dimensions than the base 26 so that an overhanging shelf 28 projects outwardly from the base 26 around the entire periphery of the upper surface 24. The base 26 may be fabricated from any suitable material such as, for example, metal.

The Slotting Head

A slotting head mechanism, generally designated 30, is disposed at the upper surface 24 of the workbench 22. The slotting head mechanism, best illustrated in FIGS. 1–4, is carried upon a rigid metal plate 32 which has been disposed in a recess 34 in the upper surface 22 of the workbench so that the plate 32 is substantially flush with the upper surface 22. A plurality of setscrews 36 (FIG. 1), preferably located at each corner of the plate 32, secure the plate to the upper surface 24.

The slotting head mechanism 30 comprises a lever or fulcrum support 38 which is essentially rectangular in configuration and which has opposed flanges 40 and 42 which project outwardly at the bottom of the lever support in an orientation parallel to the surface 24 and which are transversely bored to receive bolts 44 and 46. Bolts 44 and 46 secure the lever support 38 to the metal plate 32. A pair of spacer blocks 48 and 50 are mounted upon the lever support 38, such as with bonding agent, the spacer blocks being located juxtaposed the plate 32 adjacent each end of the lever support 38 on the forward face 52 thereof.

The spacer blocks 48 and 50 are illustrated as having rounded corners and are adapted to accurately position the workpiece for the purpose hereinafter more fully described. The front face 52 is further provided with a semicylindrical recess 54 which is disposed essentially equidistant between the spacer blocks 48 and 50. The recess 54 defines in part the path of a rotatable cutting blade 56. The cutting blade 56 is secured to a shaft 58 between a nut 60 and a spacer 62 which nut in threadedly connected to the shaft 58. Shaft 58 is rotatably disposed through aperture 55 in the plate 32 and also through the hollow 57 of thrust bearing 64 carved upon the plate 32.

As illustrated in FIG. 3, the peripheral edge of the thrust bearing 64 is aligned with the leading edge of spacer blocks 48 and 50 so that a linear edge of a workpiece can be guided therealong to cause blade 56 to cut a central slot in the linear edge. Also, corner portions of the workpiece can be slotted to a uniform depth by rotating the corner portion at the thrust bearing 64.

The shaft 58 is rotated by an electric motor 66 (best shown in FIG. 4), which is provided with side brackets 68 and 70 which are bolted to the underside of the plate 32 with bolts 72 and 74, respectively. Although any suitable electric motor could be used, the model 100M motor, 115 volt AC-DC, manufactured by Rockwell Manufacturing Company, is presently preferred.

The motor 66 is connected by electrical line 76 to a circuit box 78 which is in turn connected to a switch 80 also comprising a 7 amp heater fuse. The switch box 80 is connected by electrical line 82 to a 110 volt power source (not shown).

With continued reference to FIGS. 2 and 3, it can be observed that the lever support 38 is provided with three U-shaped recesses 84 which open to the exterior at the upper edge 86 of the lever support 38. A rod 88 is disposed through a longitudinal bore hole (not shown) and extends through the entire length of the lever support 38 adjacent the upper edge 86 and essentially central of the transverse dimension thereof. The rod 88 is threaded at each end 90 and 92 and secured by the threaded engagement of nuts 94 and 96.

Rod 88 serves as an axle for levers 98, 100 and 102, each of which is essentially identical one with another and is disposed in one of the recesses 84 in the lever support 38. Inasmuch as the levers 98, 100 and 102 are substantially identical, only the structure of lever 100 will be described.

Lever 100 is preferably formed of rigid metal, such as steel, which is preferably rectangular in shape and which has a transverse aperture 104 (FIG. 3) through which rod 88 is disposed. The lever 100 is pivotally movable with respect to the rod 88, which movement is limited by the bottom of the recess 84 and by the resilient biasing structure 106.

The biasing structure 106 comprises an upstanding shaft 108 having threaded ends 116 and 117, end 117 threadedly engaging the metal plate 32 in the workbench 22. Shaft 108 loosely passes through an aperture 110 in the trailing end 112 of the lever 100. The aperture 110 is sufficiently larger in diametral dimension than the diametral dimension of the shaft 108; that the trailing end 112 of the lever 100 may be displaced relative to the shaft 108 when the lever 100 is pivoted about rod 88. An adjustable nut 114 threadedly secured to the upper end 116 of the shaft 108 and a washer 118 interposed between the nut 114 and the bar 100 define the upper limits of the movement of the trailing end 112 of the lever 100 relative to the shaft 108. Also, a compression spring 120 urges the trailing end 112 toward the uppermost position as defined by the nut 114 and washer 118 and is yieldable to accommodate downward relative displacement of the trailing end 112 relative to the shaft 108.

The leading end 122 of lever 100 is provided at the underside 124 thereof with a socket 126 which is secured to the end 122 by set screws 128 (see FIG. 2). A spherical ball 130, such as ball bearing, is captively disposed within the socket 126 and is rotatable therein. The socket 126 is constricted at the downward end 132 so as to retain the ball 130 within the socket 126.

In the operation of the slotting head mechanism 30, the switch 80 is closed to energize the motor 66 which in turn revolves the shaft 58 and attached cutting blade 56. The peripheral edge of a workpiece is then guided past the cutting blade 56 by maintaining the edge of the workpiece against the spacer blocks 48 and 50 and/or the bearing 64 until blade 56 has cut a central groove around the entire periphery of the workpiece The levers 98, 100, and 102, having been preset into a desired space relation with the upper surface of plate 32 by correctly locating the nuts 114, exert a constant downward bias upon the workpiece as it is displaced in the indicated manner. Thus, any tendency of the edge of the workpiece to move up or down relative to the plane of the cutting blade 56 is substantially reduced, if not completely obviated. The spherical balls 130 serve as antifriction structure to allow the workpiece to be so displaced without undue restraint. The spacer 62 can readily be exchanged for any one of several others of various axial lengths to insure the cutting of a central slot in workpieces of different thicknesses.

The Guiding and Cutting Unit

Reference is now made to FIGS. 5-13, which illustrate the guiding and cutting unit comprising part of the presently preferred embodiment of the invention. The guiding and cutting unit, generally designated 140, is situated upon a metal base plate 142 disposed upon edge supports 143 within a recess 144 in the upper surface 24 of the workbench 22. The metal plate 142 is secured in place by countersunk wt screws 146 which threadedly engage aperture 147 in shoulder 143, the plate 142 being essentially flush with the upper surface 24.

The guiding and cutting unit 140 comprises a rigid block 146, preferably of metal, which is rigidly secured to the plate 142 by screws or other suitable securing means. The block 146 is provided with an open longitudinal recess 148 which is vertically oriented in the lower front face of the block 146. The bottom of the recess 148 opens at upper surface of the plate 142. The block 146 is also provided with a transverse essentially vertical space 150 (FIG. 8) situated adjacent left end 151 as viewed in FIGS. 5 and 6. The purpose for space 150 will be hereinafter more fully described.

Substantially opposite hand members 152 and 154 are secured on the front face 156 of the block 146, one member flush with each end of the block. The members 152 and 154 are rigidly secured to the block 146 by setscrews 158. Each of the members 152 and 154 has an angularly disposed face 160 and 162, respectively, which, along with a central portion 164 existing between the members 152 and 154 on the front face 156 defines a tapered notching channel 166. The member 152 provides a continuation of space 150.

The members 152 and 154 are provided respectively with aligned transverse essentially horizontal slots 168 and 170, which communicate with the recess 148 of the block 146 so that a side-oriented T-shaped channel 172 results.

The T-shaped through-channel 172 is adapted to receive and guide the displacement of conventional T-edging, generally designated 174 (FIG. 6), which is preferably formed of plastic or other yieldable material. The T-edging 174 comprises a top portion 176 and tongue 178 which is central of and perpendicular to the top portion 176. The T-edging 174 is adapted to loosely pass through the through-channel 172 (on its side) without restraint by the cutting unit 140 and, when therein disposed, a length of the tongue 178 of the T-edging 174 will be exposed in the notching channel 166.

A notching die 180 which is essentially trapezoidal in cross section is disposed within and substantially fills a vertical portion of the length of the channel 166. It is preferred that the notching die 180 be sized so as to form a close tolerance relation with the channel 166 which allows for easy reciprocation of the die within the channel at the selection of the operator. As best illustrated in FIG. 7, the cutting die 180 has a lower sharpened cutting edge 182 which is adapted to make a clean cut through the tongue 178, in the manner shown at 179 in FIG. 6, at an exact location along the T-edging.

The notching die 180 is provided with an open groove 184 (FIG. 6) which extends through the entire vertical dimension thereof and which opens at the front face 186 of the die 180. An actuating bar 188 is rigidly secured in the groove 184 to the notching die 180 by vertically aligned screws 190. It should be observed that groove 184 has a depth which is at least as great as the transverse dimension of the actuating bar 188 so that bar 188 will not project beyond the surface of the exposed face 186 of the notching die 180. The actuating bar 188 is adapted to loosely pass through an aperture 192 (FIG. 7) disposed in the plate 142.

The lower end 194 of the actuating bar 188 is secured by a thumbscrew 196 to a coupling member 198. Coupling member 198, best shown in FIG. 8, is essentially rectangular in shape and is provided with a transverse bore 197 and an axial slot 199 which opens into the bore 197 thereby forming jaws 201 and 203. A bolt 205 passes through a bore (not shown) in jaw 203 and threadedly engages a bore (not shown) in jaw 201. Thus, when bolt 205 is tightened, the effective diameter of bore 197 is decreased. Bore 197 receives shaft 200 of pneumatic cylinder 202 and the shaft is secured by tightening bolt 205.

Preferably, the pneumatic cylinder 202, which may be any suitable type, is a one-way, spring-return pneumatic cylinder and is in communication through high pressure tubing 204 with a conventional dump valve 206. One suitable cylinder is Model 3453A, manufactured by A. Schrader's Son, a division of Scovill Manufacturing Company, Inc. 470 Vanderbilt Avenue, Brooklyn, New York. Although any suitable dump valve could be used, one presently preferred valve is manufactured by George S. Thompson Company, Industrial Products Division, Westinghouse Air Brake Company, parts catalog number P52935-2.

The dump valve 206 (FIG. 7) is connected by high-pressure tubing 208 (FIG. 7 and 11) to an air switch or valve 210 (FIG. 11). The air valve 210 is connected by line 212 (FIG. 11) to an air processor, generally designated 214 (FIG. 1), which will be subsequently more fully described. Dump valve 206 rapidly transfers the air under pressure to cylinder 202 when valve 212 is opened.

Air valve 210 has, depending therefrom, an actuating plunger 216. The plunger 216 is engaged by bar 220 when the bar 220 is pivoted clockwise (as per FIG. 11) about the axis provided by pivot pin 222. Pivot pin 222 projects through an aperture (not shown) in side 27 of the base 26. The trailing end 224 of the bar 220 is integrally connected to a weight 226 which urges the bar 220 counterclockwise about the pivot pin 222 away from the plunger 216.

A substantially similar bar 228 is illustrated as being disposed at opposite sides of base 26 from the bar 220 within the base 26 and is similarly pivoted and may also be weighted. A foot bar 230 is rigidly secured, such as by welding, to the bar 220 and the other pivot bar 228 (FIG. 11). When bar 230 is depressed, such as with the foot, bars 220 and 228 will pivot clockwise about the axis of pivot pin 222 against the bias of the weight 226. Clockwise rotation of the bar 220 will displace the actuating lever 216 relative to the air valve 210 thereby opening the air valve 210 and actuating the pneumatic cylinder 202 and notching blade 180 (to the dot position of FIG. 6) to cut notch 179 (FIG. 6) in the tongue of the T-edging. When the downward force on bar 230 is removed, weight 226 will rotate bars 280 and 288 counterclockwise to cause the valve 210 to close and allow the spring return (not shown) in cylinder 202 to return the notching blade to the solid line position of FIG. 7.

Referring now to FIGS. 6, 9 and 10, as explained the block 146 and the member 152 of the guiding and cutting unit 140 provides a transverse space 150 located adjacent the end 151 of the member 152. The space or channel 150 intersects the T-shaped channel 172 at essentially right angles.

A blade 232 with a knife edge 234 in normally disposed at block 146 in the channel 150 thereof and is adapted to reciprocate as will be more fully described. The leading end portion 234 of the blade 232 is disposed angularly relative to the channel 150 and severs the T-edging 174 when the severing blade is displaced from solid line to the dotted line position of FIG. 9. The trailing end 236 of the severing blade 232 is interposed in the bifurcation 238 of a connecting assembly 240. A thumbscrew 242 bridges the bifurcation 238 and thereby passes through an aperture 244 in the severing blade 232 to provide a pivotal connection therewith. The connecting assembly 240 has a diametrically reduced shaft portion 246 which passes through an elongated slot 248 in the metal plate 142. The connecting arm 240 is provided with an aperture or bore 250 in the enlarged lower block end 252 thereof, the aperture 250 opening into a slot 254 in the block which defines opposed jaws 260 and 262. Jaw 262 is provided with a transverse bore through which a threaded bolt 256 loosely passes. Bolt 257 has an enlarged head 258 and a shank 256 which threadedly engages an internally threaded bore hole (not shown) in jaw 260. Thus, when bolt 257 is tightened, jaws 260 and 262 are drawn together and aperture 250 is constricted.

A shaft or piston rod 264 comprising part of the one-way cylinder 266 is joined to the coupling 240 by insertion thereof into aperture 250 and tightening the bolt 257. One suitable cylinder is Model 3353A, manufactured by A. Schrader's Son. Cylinder 266 is actuated to displace shaft 264 (FIG. 9) in one direction from the solid line to the dotted line position of FIG. 9 when air under pressure is communicated from high pressure line 268 through dump valve 270 and high pressure line 272 to the cylinder 266. Dump valve 270 may be the same as the dump valve 206, illustrated in FIG. 7 and previously described.

Line 268 is operably connected to an air valve 274 (FIG. 11) which may be substantially the same as air valve 210. Valve 274 is provided with a downwardly extending actuating rod 276 which functions to control the operation of the air valve 274, the actuating rod 276 being displaced to an open position when engaged and moved by a bar 280. The bar 280 is in spaced vertical alignment with bar 220 and pivots about the axis of pivot pin 282 which is preferably disposed in an aperture (not shown) in the side 27 of the base 26. A weight 284, disposed at the trailing end 286 of bar 280, urges the bar 280 in a counterclockwise direction about pivot pin 282 away from actuating rod 276. Thus, valve 274 is normally in the closed position. A substantially diametrically opposite bar 288 is similarly pivoted about a pivot pin (not shown) at the opposite side of the base 26 and may be similarly weighted. Bar 280 and bar 288 are united exterior on the base 26 by a foot bar 290. Foot bar 290 is parallel to and above bar 230 and is somewhat closer to the base 26 so that both bars 230 and 290 can be independently depressed with ease by the foot of an operator (not shown). When bar 290 is downwardly depressed, bars 280 and 288 will rotate clockwise about the axis of pivot pin 282, and bar 280 will engage actuator 278 to thereby open valve 274.

If desired, the severing blade embodiment illustrated in FIGS. 12 and 13 could be used to cut the T-edging to precise lengths. The severing blade embodiment of FIG. 12 comprises a saw blade 450 which is preferably disposed within an enlarged cavity 452 in the block 146 and member 152. The saw blade 450 is journaled to the upper end 453 of a beam 454 which passes through slot 455 in metal plate 142. The lower end 456 of beam 454 is pivotally secured by a pin 458 to the end 459 of connecting rod 460. The opposite end 462 of connecting rod 460 is disposed in a transverse bore 464 of a coupling block 466. The end 462 of the connecting rod 460 is pivotally attached to the coupling block 466 by a pin 468 transversely disposed through the bore 464 about midlength thereof. The bore 464 is sufficiently larger than the connecting rod 460 that limited pivotal movement of the connecting rod 460 about the pin 468 is possible.

The coupling block 466 is provided with a parallel bore 470 into which the shaft 264 has been inserted and secured by transverse pin 472. Shaft 264 comprises part of pneumatic cylinder 266 which was previously described in connection with FIG. 8.

The saw blade 450 is driven preferably by a primary drive chain 474 which is engaged by sprocket 476 integral with the cutting wheel 450 and freewheeling sprocket 478 which is journaled to the beam 454 at a location preferably between the center of its length and the end 456 thereof. The freewheeling sprocket 478 is a tandem sprocket also engaging a secondary drive chain 480 which connects the freewheeling sprocket 478 with a drive sprocket 482 mounted upon a drive shaft 484 comprising part of a conventional electric motor 486. The electric motor 486 is united to the metal plate 142 by a mounting bracket 488.

The freewheeling sprocket 478, as illustrated in FIG. 13, is rotatably mounted upon a shaft 477 which passes through an aperture 479 in the beam 454, shaft 477 being rigidly connected to a bracket 481 depending from metal plate 142. Shaft 477 serves as a pivot point for the beam 454. Thus, in the operation of the severing blade embodiment 488, the electric motor 486 is energized to cause the saw blade 450 to rapidly rotate. Thereafter, the pneumatic cylinder 266 may be actuated to displace the coupling block 466 from the solid line to the dotted line in FIG. 12. Displacement of the coupling block 466 causes the beam 454 to pivot about shaft 477 from the solid line to the dotted line position in the Figure so that the saw blade 250 is displaced transversely across the through-channel 172. When T-edging is disposed in the through-channel 172 it is completely severed by the saw blade 450.

The severing blade embodiment 448 is particularly useful where the T-edging 174 is sufficiently tough that severing blade 232 (FIG. 8) cannot effectively sever the T-edging.

To operate the notching and/or severing blades, air under pressure is communicated from source (not shown) to valves 274 and 210 through high pressure lines 292 and 212, respectively, to the processor 214 (FIG. 1). The air processor 214 comprises a filter 294 which is adapted to filter air communicated thereto by line 296. The filter 294 may be of any suitable type, such as B731-201, manufactured by Bellows-Valvair, Akron, Ohio. Filter 294 is connected by air lines 298 to a lubricator 300. The lubricator 300 may be of any suitable type, although the Bellows-Valvair lubricator B921-201 is presently preferred. The air which has been filtered by filter 294 is bubbled through oil located in the lower portion of lubricator 300, the air so processed lubricates the air valves and pneumatic cylinders to which it is subsequently communicated.

A mounting block 302 is rigidly secured to the side 27 on the base 26 and securely receives lines 298 between the filter 294 and the lubricator 300 to thereby hold the processor 214 in the illustrated convenient, stationary location on the base 26. After the air has been lubricated by lubricator 300, it is communicated through a T-connector 304 to lines 292 and 212, respectively connected to air valves 274 and 210 (FIG. 11).

Thus, it can be appreciated that, when bar 230 (FIG. 11) is depressed to open air valve 210, valve 210, dump valve 206 and pneumatic cylinder 201 will be lubricated by the air, making supplemental lubrication unnecessary. Similarly, when bar 290 is depressed to open air valve 274, the valve 274, dump valve 270 and pneumatic cylinder 270 will be lubricated by the air.

The Indicator Block

Referring again to FIG. 6, the exposed side 186 of the notching blade 180 is preferably covered with an indicator block 305. The indicator block 305 is provided with transverse countersunk apertures 306 adjacent the outside surface 307 of the indicator block 305. Bolts 308 are disposed through the apertures 306 and threadedly engage axially aligned bore holes 309 in members 152 and 154. The end face 317 of the block 305 has a greater transverse dimension than end face 319 thereof so that the face 307 slopes right to left (FIG. 6) toward the T-edging as it emerges from the channel 172. Thus, as the workpiece 406 is displaced adjacent and parallel to the face 307 (FIG. 1), it will meet the emerging T-edging 174.

Indicator block 305 is provided with a transverse slot 311 which is in substantial alignment with space 150 (FIG. 9) or cavity 452 (FIG. 12) in which the severing blade 232 or the saw blade 450 are respectively disposed. The face 307 of the indicator block 305 is recessed at 313 to provide a shoulder 315 along the upper edge thereof, the recess 313 extending from the slot 311 along the front face 307 of the indicator block 305 and the opening at the side edge 317 thereof. An abutment surface 319 is formed by the unrecessed portion of the face 307 adjacent the slot 311.

A vertical groove or line 321 is formed in the face 307 at a location immediately opposite the center of the notching die 180 in the assembled position. Thus, as a workpiece 406 (FIG. 1) is manually displaced in close proximity to the face 307 of the indicating block 305 as shown in FIG. 1, the groove 321 will serve to indicate the position on the workpiece with respect to the notching die 180. When a corner portion, e.g., 407, of the workpiece becomes aligned with groove 321, the notching die 180 is actuated to notch the tongue 178 of the T-edging 174 as at 179 (FIG. 6). When the T-edging 174 thus emerges from the cutting unit 140, the notch 179 located therein will be disposed at the corner portion of the workpiece to accommodate even, unobstructed contiguous bending of the edge portion 176 of the T-edging 174 around the corner 407 of the workpiece.

Also, when the T-edging 174 has been disposed around substantially the entire periphery of a workpiece 406, the lending edge 409 of the T-edging is displaced adjacent the recess 313 until it abuts the abutment shoulder 319, which acts as a stop. Thereafter, the severing blade 232 may be actuated to cover the trailing portion of the T-edging at a precise location so that after the T-edging emerges from the cutting unit 140, the trailing end (not shown) will ultimately tightly abut the leading end 409 thereby to provide only a hairline joint between the ends of the T-edging.

The Reciprocable Hammer

Reference is now made to FIGS. 1, 4, 5 and 14-16 which illustrate one presently preferred hammer embodiment, generally designated 310. Hammer 310 comprises an annular hammer head 312. As best illustrated in FIG. 14, the hammer head 312 is exteriorly cylindrical in shape and is provided with an annular interiorly open groove 322 spaced slightly above the lower edge 324 of the hammer head 312. The groove 322 is adapted to receive a laterally extending flange 327 of disc-shaped hold down devices 326, two substantially identical devices 326 being illustrated at diametrically opposite interior sides of the hammer head 312. Each device 326, best shown in FIG. 15, is integral with the flange 327 which is disposed within groove 322. Each device 326 is maintained in the holding position with respect to the hammer head 312 by a threaded bolt 331 which passes through aperture 325 in device 326 and is threadedly secured to metal plate 142. Nut 331 has a hexagonally shaped blind bore 335 which receives a wrench for tightening the bolt 331 in the plate 142. Each of the device 326 is prevented from rotating by vertically disposed dowels 328 each passing through aperture 329 into blind bore 333 in metal plate 142. The devices 326 define the path of the reciprocating movement of the hammer head 312 along a single path essentially normal to a line connecting the two devices 326, as will be hereinafter more fully described.

The hammer head 312 is provided with an internally projecting bracket 330 having an upper arm 332 and a lower arm 334 defining a U-shaped channel 336 therebetween (FIG. 16). Arms 332 and 334 are provided with axially aligned threaded apertures 338 and 340, aperture 338 having a greater diametrical dimension than aperture 340. A bearing shaft 342 has threaded ends 344 and 346 which are respectively sized so as to threadedly mate with apertures 338 and 340. Bearing shaft 342 has a smooth central portion 348 which is a bearing surface. A hexagonal blind bore 337 at end 344 of the shaft 342 is adapted to receive a wrench for tightening and loosening the shaft 342.

A cylindrical wheel or follower 350 in the form of a bearing is rotatably disposed upon bearing shaft 342 and is interposed within the bracket 330 so that only a relatively small peripheral margin 352 is exposed beyond the peripheral edges of arms 332 and 334. The follower 350 is adapted to be selectively engaged by cam 354.

Cam 354 having a plurality of lobes 355 has an axial bore 353 with an axial keyway 357 disposed therein. A motor shaft 356 is carried within the bore 353 and is provided with a keyway 359 which is aligned with keyway 357 so that a key 361 in the keyways 357 and 359 will nonrotatably join the cam 354 and motor shaft 356. The cam 354 is provided with counterbore 358 in the top 360 thereof into which the uppermost end 362 of shaft 356 projects. The end 362 of shaft 356 is provided with an annular recess 364 which receives the snap ring 366. Snap ring 366 axially retains the cam 354 on shaft 356 and thereby holds key 361 in place. The lower surface 368 of cam 354 rests upon the upper surface of an annular flange 369 of a bearing 370, preferably of nylon, which circumscribes a portion of the entire radial circumference of shaft 356 and which tightly rests in an aperture 372 in the metal plate 142.

The cam follower 350 along with the hammer 312 are normally urged out of contact with the cam 354 by tension spring 374 (FIG. 14A). Spring 374 is provided with hook ends 376 and 378, the end 376 engaging a rigid pin 380 disposed in the recess 322 of the hammer head 312 and end 378 engaging a pin 382 which is rigidly joined to the metal plate 142 (FIGS. 14 and 16). When no external force is exerted upon the hammer head against the bias of spring 374, the hammer head 312 will be brought into contact with cylindrical stop 375 which is rigidly mounted upon metal plate 142 by bolt 377 and cam follower 350 will remain stationary, out of contact with cam 354, as shown in FIG. 14A.

As best shown in FIG. 16, the hammer head 312 is carried upon ball bearings 384 disposed at spaced locations around the periphery of the head between the plate 142 and the hammer head 312. At each of the mentioned spaced locations, the hammer head is provided with an elongated groove 386 normal to a line between the two devices 326 and the plate 142 is provided with a spherically grooved insert 388, the groove 386 and the insert 388 defining bearing race structure for the ball bearing 384. Bearings 384 accommodate smooth reciprocal movement of the hammer head 312 relative to the metal plate 142 in said normal direction. All bearing races are preferably of case hardened material.

Figure 5:
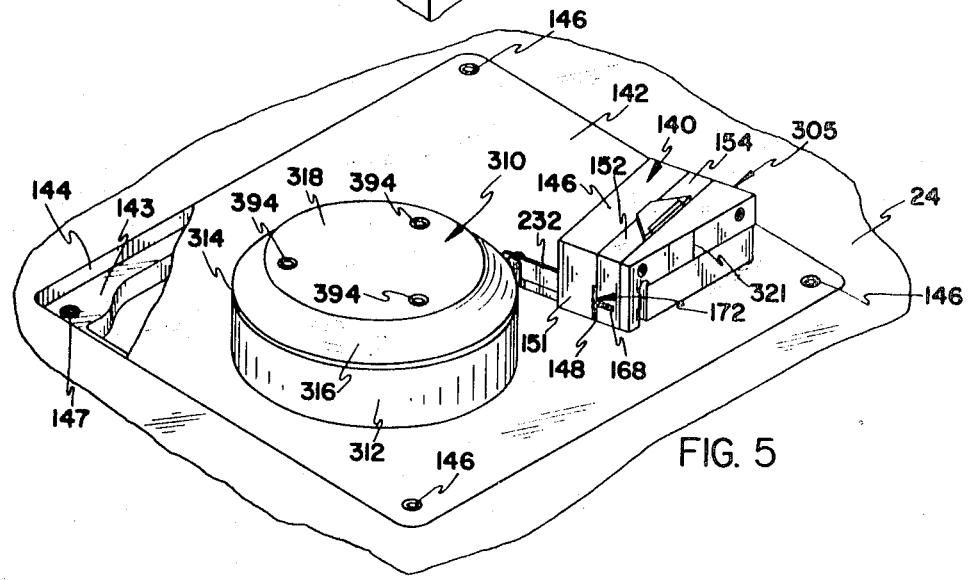
FIG. 5 is an enlarged perspective view illustrating the hammer, and guiding and cutting unit of FIG. 1 with the T-edging eliminated, portions being broken away to reveal support structure.

A plurality of upstanding pillars, each designated 390, are rigidly mounted upon the metal plate 142 at radially spaced locations around the cam 354 within the cylindrical hammer head 312. Each pillar 390 has a vertical length slightly greater than the vertical dimension of the hammer head 312 and is provided with an axial bore 392 which is threaded to receive set screws 394 (FIG. 5). Setscrews 394 are adapted to pass through and secure a cap or cover plate 314 in a position spaced slightly above the hammer head 312. Cap 314 is essentially disc-shaped having upper surface 318 and lower surface 320, a rounded peripheral edge 316 being disposed between the surfaces 318 and 320. When the cap 314 in united to the pillars 390, as described, the cap 314 is united to the pillars 390, as described, the cap 314 will remain stationary relative to and slightly spaced from the hammer head 312 as it reciprocates.

Reference is now made to FIG. 4 which illustrates the structure for rotating shaft 356 and cam 354 attached thereto. Shaft 356 is presented by electric motor 396 which may be any suitable electric motor such as the Capacitor AC motor, model no. 5K436E, ¾ horsepower, manufactured by Dayton Electric Manufacturing Company, Chicago, Illinois. The motor 396 is connected by electrical wiring 398 to an electrical outlet box 400 controlled by switch 492 which may comprise a 12 amp heater fuse. Power to the box 400 is provided through line 404 from circuit box 78 which is electrically connected through line 82 to a power source (not shown).

In the method of using the hammer 310, a workpiece 406 (FIG. 1) receives the leading end of the strip of T-edging 174, the tongue of which is pressed into a previously cut peripheral groove 408 in the workpiece. The workpiece and edging are jointly positioned so that the T-edging 174, requiring progressive insertion into the peripheral groove 408, is disposed adjacent the hammer head 312. An operator (not shown) then urges the workpiece 406 against the hammer head 312, as indicated by force arrow 399 (FIG. 14), until the hammer head 312 is laterally displaced against the tension bias of the spring 374 (FIG. 14) to place the cam follower 350 in contact with the cam 354. As cam 354 rapidly rotates, the cam lobes 355 serially strike the follower 350 to serially displace the hammer head 312, thereby transmitting a striking force to the T-edging and workpiece to progressing drive the tongue of the T-edging into the peripheral groove in the workpiece as the T-edging and workpiece are jointly displaced along the hammer. The resulting movement of the hammer head 312 is accommodated by the ball bearings 384 (FIG. 16) disposed in the elongated groove 386. When the workpiece 406 is displaced away from the hammer head 312, spring 374 urges the hammer head 312 against the stop 375 in the inactive position of Figure 14A where the cam follower 350 is out of contact with the cam 354.

Reference is now made to FIGS. 17 and 18 which illustrate another presently preferred hammer embodiment, generally designated 410. Hammer 410 is similar in many respects to the hammer 310 and, in those respects, similar parts are given like numerals throughout. In the hammer embodiment 410, the hammer head 312 is provided along diametrically opposed sides with guide plates 412 which are essentially identical, though opposite hand. Each plate 412 presents a curved surface 414 which is welded or otherwise rigidly attached to the hammer head 312 and a substantially linear edge 416. A carriage bar 418 (FIG. 18) is mounted upon the guide plate 412 by rivets 420 and is disposed beneath plate 412 and projects laterally away therefrom. Carriage bar 418 is adapted to be disposed between plates 422 and 424 which are vertically spaced by spacer 426. Plates 422, 424, and spacer 426 are maintained in a fixed position relative to one another by bolts 428 which pass through aligned apertures 430, 432 and 434 in the plate 422, spacer 426 and plate 424, respectively. Bolts 428 are threadedly secured to the metal plate 142.

The carriage bar 418 is provided with axial grooves 436 and 489 which comprise linear bearing races in which ball bearings 440 and 442 are disposed. Plates 422 and 424 are provided with similar aligned bearing races 444 and 446. All races are preferably of a case hardened material. Thus, hammer head 312 of FIGS. 17 and 18 is supported by guide plate 412 and carriage bar 418 upon ball bearings 440 and 442 so that hammer head 312 is capable of smooth reciprocal movement along a single path indicated by force arrow 447. Plates 422 and 424 are provided with abutment shoulders 425 which function as stops for the hammer head 312 when spring 374 urges the hammer head to the inactive position. The use of the hammer head 312 of FIGS. 17 and 18 is essentially the same as hammer head 312 of FIGS. 14–16.

From the foregoing, it is clear that the presently preferred edging apparatus 20 accommodates precise grooving of the peripheral edge of the workpiece 406 at the slotting head 30. Also, T-edging is guidedly dispensed through the cutting unit 140 in the proper orientation and is selectively notched and/or cut at the election of the operator to accommodate bending of the T-edging around the corners of the workpiece and severing the T-edging at the precise location accommodating a precise edge-to-edge abutment where the ends of the T-edging meet on the workpiece. An indicating block 305 mounted upon the cutting unit 140 makes notching and severing at precisely determined locations possible. Similarly, an effective, completely safe hammer, normally in an inactive state, is selectively activated by the displacement of the hammer head with the workpiece to drive the tongue of the T-edging into the slot in the peripheral edge of the workpiece.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. Apparatus for fabricating a groove in the peripheral edge of a generally flat workpiece comprising a planar working surface, workpiece-positioning means and grooving means, the grooving means comprising groove-cutting blade means disposed above the working surface in predetermined relation to the working surface, the workpiece-positioning means being disposed above the working surface and comprising (a) means adjacent the blade means along which the peripheral edge is displaced to control the depth of the groove cut by the blade means in the peripheral edge and (b) means for biasing the workpiece against the working surface to control the location at which the groove is cut in the peripheral edge by the blade means, said biasing means comprising lever means disposed above the working surface and centrally pivotally surmounting support structure to selectively accommodate a rocker action by the lever means, the lever means comprising workpiece-engaging arm means, and other arm means biased to urge the workpiece-engaging arm means toward the working surface, the bias of the other arm means allowing displacement of the workpiece-engaging arm means away from the working surface, and stop means constraining the lever means such that the workpiece-engaging arm means cannot be displaced by the rocker action beyond a minimum predetermined distance from the working surface.

2. Apparatus of the type defined in claim 1 wherein said workpiece-engaging arm means comprise antifriction means to accommodate smooth displacement of the workpiece relative to the workpiece-engaging arm means.

* * * * *